W. I. HARE.
TROWEL.
APPLICATION FILED APR. 25, 1919.
1,323,980.
Patented Dec. 2, 1919.
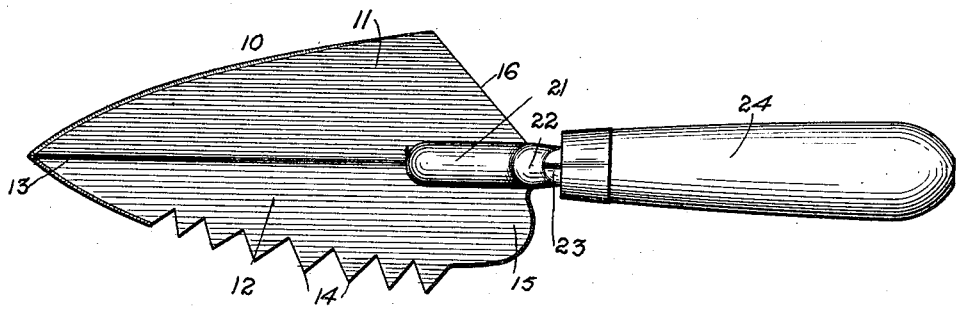
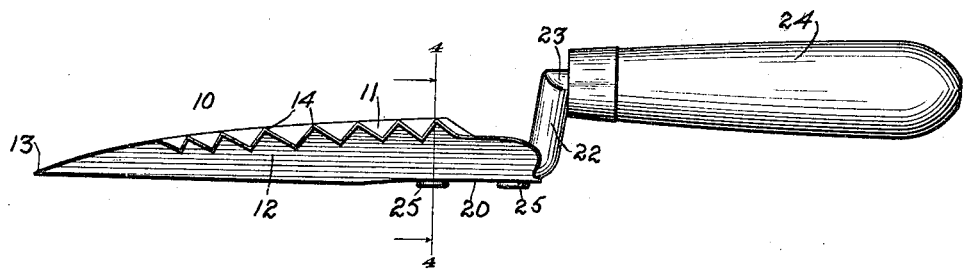
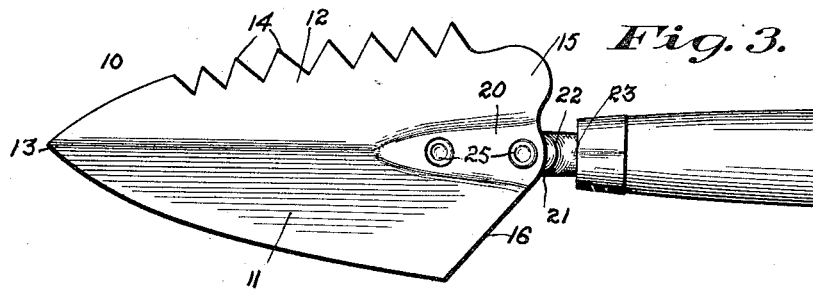
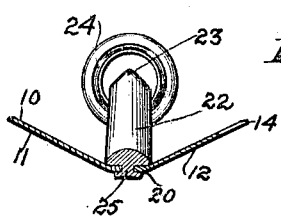
WITNESSES
INVENTOR
WILLIAM I. HARE
BY
ATTORNEYS

UNITED STATES PATENT OFFICE.

WILLIAM I. HARE, OF NEW YORK, N. Y.

TROWEL.

1,323,980.  Specification of Letters Patent.  Patented Dec. 2, 1919.

Application filed April 25, 1919. Serial No. 292,621.

*To all whom it may concern:*

Be it known that I, WILLIAM I. HARE, a citizen of the United States, and a resident of the city of New York, borough of Manhattan, in the county and State of New York, have invented a new and Improved Trowel, of which the following is a full, clear, and exact description.

The invention relates to gardening implements, and its object is to provide a new and improved trowel for the use of gardeners, florists, greenhouse men and other persons, and arranged to permit the user to readily pulverize the earth and loosen the roots of weeds to allow easy removal of the weeds and their roots without disturbing adjacent plants. Another object is to permit of readily transplanting growing plants without danger of loosening the ground adhering to the roots of the plants. Another object is to provide an efficient weeding and transplanting tool which is exceedingly strong and durable and capable of withstanding rough usage.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a plan view of the trowel;

Fig. 2 is a side elevation of the same;

Fig. 3 is an inverted plan view of the same; and

Fig. 4 is an inverted cross section of the same on the line 4—4 of Fig. 2.

The blade 10 of the trowel is made approximately V-shaped in cross section thereby providing two side members 11, 12 which gradually diminish in width from the rear end of the blade to the front end thereof, the said side members terminating in a point 13 at the forward end of the apex of the blade. The side member 12 has a portion of its outer edge provided with teeth 14 which begin a distance from the point 13 and terminate a distance from the rear end of the side member 12. The teeth 14 are preferably triangular in shape and the rear end 15 of the side member 12 is rounded off from the rearmost tooth toward the apex to form a guard for protecting the rearmost tooth 14, especially when using the tool for weeding purposes, that is, cutting the root with a stroke toward the user. It will also be noticed that this rounded-off rear end 15 of the side member 12 allows the side member to readily pass into the ground on drawing the tool toward the user, and as this rounded-off portion leads to the base of the rearmost tooth it is evident that the latter can readily start to cut the root of a weed. The other side member 11 of the blade 10 has its rear edge 16 inclined in a forward and outward direction for the purpose of breaking up the ground or cutting sod or trimming edges of flower beds and the like.

The rear middle portion 20 of the blade 10 is flattened and onto the upper surface of this flattened portion fits a forwardly extending attaching member 21 of a shank 22 extending upwardly and slightly rearwardly and terminating in a tang 23 fastened in a handle 24. The under side of the attaching member 21 is provided with integral rivets 25 extending through apertures in the flattened portion 20 and having their heads extending over the under side of the flattened portion to securely fasten the shank 22 in place on the blade 10. It will be noticed that by this arrangement the handle is offset relative to the blade 10 to permit of pushing or drawing the tool through the ground without danger of injuring the fingers of the user's hand having hold of the handle 24.

By making the blade 10 V-shaped in cross section the desired rigidity is obtained to readily withstand rough usage of the trowel. By providing the sharp point 13 the blade readily enters the soil to permit of digging out weeds without disturbing growing plants, the teeth 14 serving to readily cut the roots of the weeds. It will also be noticed that the teeth 14 aid in pulverizing the earth and loosening the weed roots if not cutting the same.

Having thus described my invention, I claim as new and desire to secure by Letters Patent:—

As an article of manufacture, a trowel for gardening purposes, comprising a body made approximately V-shape in cross-section thereby providing side members gradually diminishing in width from the rear ends to the front ends, the latter forming a common point, the rear middle portion of the said body being flattened and provided with apertures, a shank having an angular attaching member fitting onto one side of the said flattened portion and having integral rivets passing through the said openings with the rivet heads overlying the flattened portion at the other side thereof, the said shank having an angular tang, and a handle in which the said tang is fastened.

WILLIAM I. HARE.